United States Patent [19]

Bottrill

[11] 4,250,767
[45] Feb. 17, 1981

[54] REMOTELY CONTROLLED REARVIEW MIRROR ASSEMBLY

[75] Inventor: John Bottrill, Chichester, England

[73] Assignee: Britax (Wingard) Limited, Chichester, England

[21] Appl. No.: 9,897

[22] Filed: Feb. 6, 1979

[30] Foreign Application Priority Data

Feb. 24, 1978 [GB] United Kingdom ................. 7476/78

[51] Int. Cl.³ ........................... F16C 1/10; A47G 1/24
[52] U.S. Cl. .................. 74/501 M; 248/487; 350/289
[58] Field of Search ............ 350/288, 289; 74/501 M; 248/479, 480, 485–487

[56] References Cited

U.S. PATENT DOCUMENTS

| 3,444,755 | 5/1969 | Smith | 74/501 M |
| 3,592,074 | 7/1971 | Petersen, III et al. | 74/501 M |
| 3,966,162 | 6/1976 | Hadley | 74/501 M X |

Primary Examiner—F. L. Evans
Attorney, Agent, or Firm—Steele, Gould & Fried

[57] ABSTRACT

A remotely controlled rearview mirror assembly has a tiltable reflective member mounted on a fixed base in a casing, the reflective member being tilted by means of a remote control. Two or three-wire cable systems are the preferred linkage but electrical or fluidic linkages may be used. The reflective member is anchored to the base by a forked member to prevent rotation of the reflective member, in its own plane, which would otherwise cause jamming or juddering by contact with the sides of the casing. The preferred forked member is a V-shaped wire strut with arms pivotally attached to the reflective member and a necked junction part as a frictional pivot to provide damping. The reflective member is tiltably mounted by an arcuate knife edge received in a linear groove, the included angle of the groove being greater than that of the knife edge. This provides a substantially common elevational and azimuthal pivot point closer to the surface of the reflective member.

9 Claims, 5 Drawing Figures

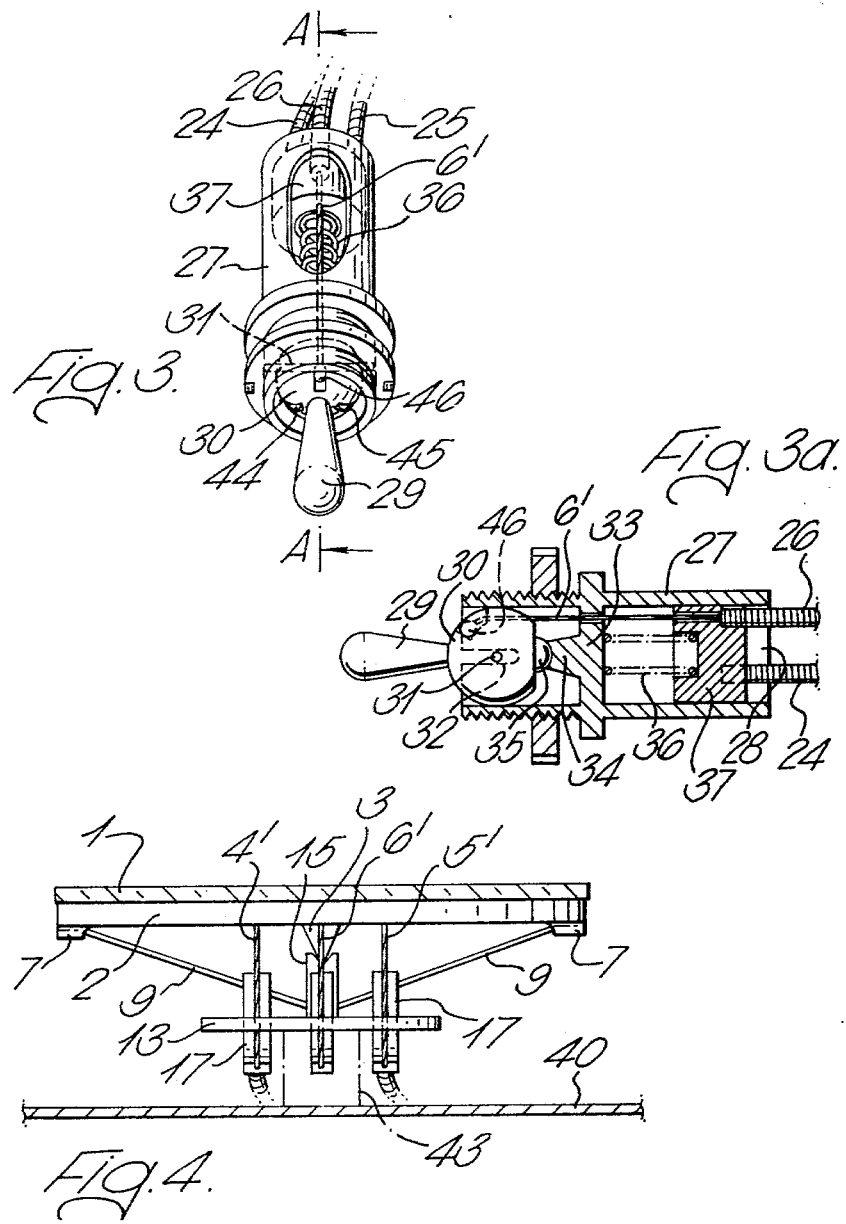

REMOTELY CONTROLLED REARVIEW MIRROR ASSEMBLY

This invention relates to a remotely controlled, rearview mirror assembly comprising a casing, a tiltable reflective member mounted on a fixed base in the casing, the reflective member being mounted for tilting movement about two mutually perpendicular axes and a clearance being provided between the peripheral edge or edges of the reflective member and the casing, and a remote control connected by a linkage to the reflective member to cause said tilting movement. The reflective member is usually the mirror secured to a backing plate having points of attachment for the linkage. However, direct connection of the linkage to the mirror is possible and the term "reflective member" is used to cover both possibilities. The reference to a "remote control" and to the "linkage" which connects the control to the "reflective member" is also intended to cover either manual or power assisted systems for tilting the reflective member. The invention, however, is particularly suited to manual systems, such as the "three-wire" control, the three wires forming a linkage between the reflective member and a manually operable member, such as a joy stick. Power assisted systems may include a miniature electric motor or motors, or solenoids, which are energised so as to tilt the reflective member on the fixed base. When the rearview mirror assembly is mounted on a vehicle, adjustment of the remote control causes the reflective member to tilt in azimuth and elevation, which movements may be either separate or compound.

In some assemblies of the above type, the reflective member is not entirely stable on its pivot point, or tilting support on the fixed base in the casing. In such a case, when the remote control is continuously operated, the reflective member can rotate in its own plane, whereby its peripheral edges touch the sides of the casing and cause jamming, or juddering. This defect is aggravated by making the mirror of larger and rectangular shape and by its wind resistance on the moving vehicle and also by vibration.

The present invention solves this problem of instability in that the reflective member is anchored by a forked member to the base for the purpose of maintaining the clearance between the peripheral edge or edges of the reflective member and the casing. The forked member has arms connected to respective opposite sides of the reflective member and has a junction part pivotally connected to the base. In a preferred embodiment, the forked member is in the form of a substantially V-shaped strut, made of wire, the junction part being formed into a loop so as to provide a necked portion for gripping the base whilst allowing pivotal movement. The gripping of the base assists in damping out any undesirable movement of the reflective member due to vibration. The remote ends of the V-shaped strut are pivotally attached to the opposite sides of the reflective member.

In assemblies of the aforementioned type, a further problem arises when there is a large distance between the reflective member and its pivot point on the fixed base. This problem is aggravated by providing for tilting movement in two mutually perpendicular axes for aximuthal and elevational adjustment. Often, two separate pivot points or tilting axes are provided, one above the other, thereby increasing the distance between the reflective member and one of the pivot points. An example of such a support is described in U.K Pat No. 1421407 wherein, for example, a reflective member is mounted for tilting movement (about one axis) on hemispherical or cylindrical projections, and also (about another axis) on an arcuate knife edge which is received in a mating groove. In the latter arrangement, the shape of the knife edge is the same as that of the mating groove to prevent any lateral twisting and hence rotation of the reflective member in its own plane. However, the greater the distance is between the reflective member and its outermost pivot point, the more is the change of instability. A greater leverage effect can be exerted about the pivot point by, for example, the wind pressure acting on the surface of the reflective member while the vehicle is in motion. The modern trend to make rearview mirrors larger and of rectangular outline, the longitudinal axis normally lying in the azimuthal plane, increases this leverage and wind effect. Therefore, a further problem facing the invention is to reduce the distance between the reflective member and its pivot point or tilting axis on the fixed base.

The solution provided by the invention, which is applicable when the reflective member and the fixed base are provided with one or other of a substantially V-shaped groove and arcuate knife edge, is to make the included angle of the groove greater than the included angle of the knife edge, and to make the knife edge both tiltable and slidable in the longitudinal axis of the groove. Such an arrangement enables respective elevational and azimuthal adjustment of the mirror about a substantially common pivot point which is close to the upper surface of the reflective member. In a preferred embodiment, the V-shaped groove extends linearly and receives the arcuate knife edge. As the included angles differ, the knife edge can tilt transversely of the groove to enable elevational movement. As the knife edge is arcuate and the groove is straight, the knife edge can also rock and slide in the longitudinal direction of the groove to enable azimuthal adjustment.

The latter knife edge tilting support of the reflective member is used in conjunction with the forked anchorage member to provide a stable assembly wherein undesirable movement of the reflective member, due to use of the remote control, to vibration and to wind pressure effects, or combinations of the same, are reduced or substantially eliminated.

The remote control and its linkage may comprise a mechanical, electrical or fluidic drive as known in the art. A mechanical drive normally comprises a "three-wire" system wherein the wires, at one end, are connected at the points of an equilateral triangle to the rear of the reflective member and, at the other end, to a remote control such as a joy stick. If control wires are not employed as a mechanical linkage, it may be necessary to bias the reflective member towards the fixed base to maintain contact whilst permitting the necessary tilting movement. In the case of using control wires, biasing means are suitably provided in the remote control for tensioning the wires and hence maintaining engagement between the reflective member and the fixed base.

The pivot point of the reflective member is perferably close to its geometric centre.

Preferably, the junction part of the forked member is attached to the fixed base at a point which is not less than one half of the shortest distance between the periphery of the reflective member and its pivot point.

In the preferred embodiment of the invention wherein the V-shaped forked member is made from spring wire, which is shaped so that its free ends are retained (by spring action) for pivotal movement in coaxial apertures or grooves in projecting members on the underside of the reflective member, a common axis through the pivot points is such as to pass perpendicularly through the longitudinal axis of the V-shaped groove at a point substantially directly above the contact point of the arcuate knife edge in the groove.

In a "three-wire" control system, the remote control may comprise a cylindrically shaped support having a member at one end to abut outer sleeves of the control cables and having a manually operable lever at its other end to which the inner wires of the cables are attached. The wires are attached at three equidistantly spaced points with respect to a common pivot point. For example, the lever has a partly spherically shaped or ball-shaped end which is retained in the cylindrically shaped support and which provides respective peripheral, equidistantly spaced locations for nipples attached to the inner wires of the control cables. At the other ends of the cables, the sleeves abut the fixed base and the inner wires are connected to the underside of the reflective member at points corresponding with the apices of an equilateral triangle. A "two-wire" control system is also possible wherein two cables and inner wires are used as before, the third point of the equilateral triangle forming a common pivot point for the reflective member in azimuthal and elevational adjustment. The part-spherical or ball-shaped end of the lever can be prevented from rotating about the central cylindrical axis of the support by providing a peg in the wall of the support co-operating with a slot in said end or vice versa. Preferably, the cylindrical support contains a piston, one side of which abuts the ends of the sleeves of the control cables and the other side of which abuts a spring, located within the cylindrical support, for tensioning the inner wires. The other end of the spring may be located against an intermediate wall in the cylindrical support so as to prevent the spring from interfering with the movement of the lever. The intermediate wall may have a projection extending therefrom to provide a pivot point for the hemispherical or ball-shaped end of the lever.

Preferably, the fixed base on which the reflective member is tiltably supported, is provided with guides for the control cables, which guides locate the outer sleeves of the cables and have arcuate grooves or apertures for turning the inner wires through, for example, 90° before attachment to respective points at the rear of the reflective member.

One way of carrying out the invention is described in detail below with reference to the drawings which illustrate only one specific embodiment, in which:

FIG. 3 is a schematic perspective view of a remote control used in the assembly of FIGS. 1 and 2;

FIG. 3a is a section on line A—A of FIG. 3; and

FIG. 4 is an end elevation showing part of the subassembly of FIG. 1.

Figure 1:
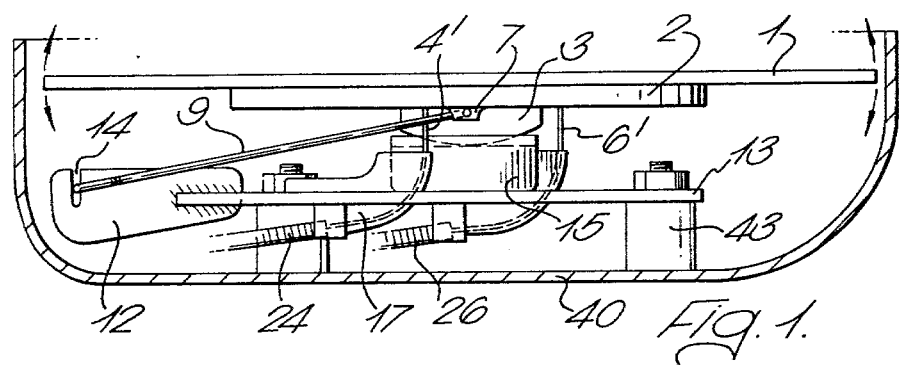
FIG. 1 is a side elevation through part of the remotely controlled rearview mirror assembly showing a tiltable reflective member mounted on a fixed base within a casing.

Referring to the drawings, the assembly comprises a reflective member 1 which is fixed to a backing plate 2 having an arcuate knife edge 3 projecting therefrom. Plate 2 has three connection points 4, 5 and 6 for the ends of inner wires 4', 5' and 6' of respective control cables. It is also provided with a pair of grooved projections 7, 8 which provide pivotal location for the respective free ends of a V-shaped wire strut 9. A junction part of 10 of strut 9 is formed into a circular loop so as to define a necked portion 11 which grips a fin-shaped part 12 of a base plate 13 when the loop 10 is received in a slot 14. The pivotal connections of the free ends of strut 9 are coaxial, the common axis perpendicularly intersecting the longitudinal axis of the knife edge 3 as shown in FIG. 2.

The base 13 is also provided with a projection 15 having a V-shaped groove 16. The included angle of groove 16 is greater than the included angle of knife edge 3 to enable a rocking action perpendicularly of the groove. The knife edge 3 is also capable of longitudinal movement in the slot 16 but is clearly prevented (by the action of the knife edge and slot) from rotating. The base 13 is also provided with three guides 17 (only one of which is visible in FIG. 1) for locating respective sleeves 24, 25 and 26 of the control wires 4', 5' and 6' respectively. The guides 17 are each provided with a bore for receiving and abutting the end of the respective sleeve and are provided with, or adjacent arcuate grooves for turning the respective control wire through 90° as shown in FIG. 1.

A remote control is shown in FIGS. 3 and 3a which comprises a cylindrical support 27 having a bore 28 in one end in which are received a piston 37 and the sleeves 24, 25, and 26. At its other end there is a control lever 29 with a part-spherical end 30 which is located, with respect to support 27 by means of a peg 31 and a groove 32. The peg 31 and groove 32 are interchangeable with regard to being provided on the part-spherical end 30 or the support 27. Preferably, the peg and groove are provided at each side of the part-spherical end 30 whereby the lever 29 may be moved, in a manner of universal joint, whilst rotation of end 30 about the longitudinal axis of support 27 is prevented. An intermediate wall 33 has a projecting 34 for locating a central projection 35 on the end 30 of the lever whereby a pivot point is provided. A coil spring 36 is located within the support 27 between wall 33 and the piston 37. Piston 37 locates the ends of the sleeves 24, 25 and 26 but has respective holes allowing the passage therethrough of the control wires 4', 5' and 6'. These wires pass through the wall 33 and terminate in respective nipples 44, 45 and 46 (FIG. 3) which are located in respective slots in the end portion 30 of the lever 29.

Figure 2:
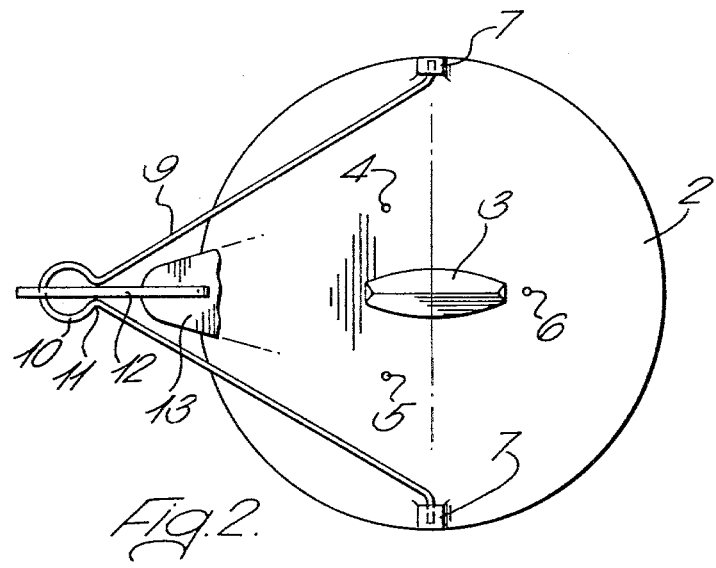
FIG. 2 is an underside view of part of the sub-assembly shown in FIG. 1 and illustrating a knife edge on which the reflective member is tiltably supported.

Referring to FIG. 2, the sub-assembly which includes the tilting mechanism for reflective member 1 is housed in a casing 40. The base 13 is secured to the casing by means of screws 41 passing through respective holes 42 and into threaded sleeves 43 which are fixed to the inner wall of the casing.

In view of the anchorage of plate 2 to the fin-shaped part 12 of the base 13, the knife edge 3 tends to slide as well as to pivot when the remote control is operated to tilt the reflective member 1 in the direction of the arrows shown in FIG. 1. The universal joint provided by the knife edge 3 and groove 16 together with the strut 9 and its necked portion 11 assist in damping out any unwanted movement of reflective member 1, for example, caused by vibration when a vehicle is driven to which the assembly is fitted. As shown in FIG. 3, the location of the nipples 44, 45 and 46 is preferably at the points of an equilateral triangle (although other configurations relative to the pivot point between projections 34 and 35 are possible) to enable an even control of the tilting movement of the reflective member when lever 29 is moved.

In operation, lever 29 is moved, as if it were a joystick, so as to pull or push on the respective control wires 4', 5' and 6' to give the required tilting movement of the reflective member 1. As the knife edge 3 can rock transversely of groove 16 as well as pivot and slide longitudinally of the groove, both azimuthal and elevational adjustment of the reflective 1 is possible together with compound movements thereof to position the reflective member 1 as required by the driver of a vehicle to which the assembly is fitted.

Preferably the knife edge 3 is made of metal and the grooved projection 15 is made of plastics to assist in damping out any unwanted vibrational movement of member 1.

The forked anchorage member or V-shaped strut 9 may be used to stabilise remotely controlled mirror assemblies in which the reflective member or mirror is supported for tilting the movement on a universal joint other than the knife edge arrangement described above.

I claim:

1. A remotely controlled, rearview mirror assembly comprising a casing, a tiltable reflective member mounted on a fixed base in the casing, the reflective member being mounted for tilting movement about two mutually perpendicular axes and a clearance being provided between the peripheral edge or edges of the reflective member and the casing and a remote control connected by a linkage to the reflective member to cause said tilting movement, characterised in that the reflective member is anchored by a forked member to the base for the purpose of maintaining the clearance between the peripheral edge or edges of the reflective member and the casing, the forked member having arms pivotally connected to respective opposite sides of the reflective member and having a junction part pivotally connected to the base.

2. An assembly according to claim 1 characterised in that the forked member is in the form of a substantially V-shaped strut, the junction part being formed into a loop so as to provide a necked portion for gripping the base while allowing said pivotal movement.

3. An assembly according to claim 2 characterised in that the ends of the V-shaped strut are turned over and are received, as pivots, in coaxial and spaced grooves in projections on opposite sides of the reflective member.

4. An assembly according to any one of the preceding claims wherein the reflective member and the fixed base are provided with one or other of a substantially V-shaped groove and arcuate knife edge for effecting said tilting movement, characterised in that the included angle of the groove is greater than the included angle of the knife edge, and that the knife edge is both tiltable and slidable in the longitudinal axis of the groove.

5. An assembly according to claim 4 characterised in that the V-shaped groove extends linearly; the arcuate knife edge tilting transversely of the groove to enable elevational movement of the reflective member and the arcuate knife edge rocking and sliding in the longitudinal direction of the groove to enable azimuthal adjustment of the reflective member.

6. An assembly according to claim 4 wherein the pivot point of the reflective member is substantially at its geometric centre characterised in that the junction part of the forked member is attached to the fixed base at a point which is not less than one half of the shortest distance between the periphery of the reflective member and its pivot point.

7. An assembly according to claim 4 characterised in that the ends of the V-shaped strut in the coaxial grooves lie on a common axis passing through the longitudinal axis of the V-shaped groove at a point substantially directly above the contact point of the arcuate knife edge in the groove.

8. As assembly according to claim 1 wherein the linkage between the remote control and the reflective member is a cable system, one end of the cable system being attached to at least two of three triangularly spaced points, characterised in that the knife edge and groove lie in a plane bisecting the triangle.

9. An assembly according to claim 1 wherein the linkage between the remote control and the reflective member is a cable system; the remote control comprises a lever connected to a pivoting joint mounted on a support; and the cable system has inner wires connected to said joint and has sleeves, for said wires, located against the support, characterised in that said support is in the form of a tube and the sleeves are located against a piston slidable in the tube, a spring being located between the piston and a stop within the tube to tension the inner wires and to retain the lever and the joint.

* * * * *